(12) United States Patent
Bush

(10) Patent No.: US 7,047,222 B1
(45) Date of Patent: May 16, 2006

(54) SECURE ENCRYPTION OF DATA PACKETS FOR TRANSMISSION OVER UNSECURED NETWORKS

(75) Inventor: Ronald Roscoe Bush, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,293

(22) Filed: Feb. 4, 2000

Related U.S. Application Data

(62) Division of application No. 08/907,298, filed on Aug. 6, 1997, now abandoned.

(51) Int. Cl.
*G06F 17/60* (2006.01)

(52) U.S. Cl. ............... 705/64; 705/1; 705/23; 705/24; 705/26; 705/27; 705/33; 705/40

(58) Field of Classification Search .......... 705/64, 705/1, 23, 24, 26, 27, 35, 40
See application file for complete search history.

(56) References Cited

U.S. PATENT DOCUMENTS

| | | | | |
|---|---|---|---|---|
| 4,558,176 | A | * | 12/1985 | Arnold et al. ............. 380/29 |
| 4,635,112 | A | | 1/1987 | Tomioka et al. .......... 358/122 |
| 4,677,434 | A | | 6/1987 | Fascenda ................. 380/23 |
| 4,853,962 | A | | 8/1989 | Brockman ................ 380/44 |
| 4,937,866 | A | | 6/1990 | Crowther et al. ......... 380/20 |
| 5,053,607 | A | * | 10/1991 | Carlson et al. .......... 235/379 |
| 5,159,634 | A | | 10/1992 | Reeds, III ............... 380/42 |
| 5,193,114 | A | * | 3/1993 | Moseley ................ 340/5.85 |
| 5,237,159 | A | * | 8/1993 | Stephens et al. ......... 235/379 |
| H1414 | H | | 2/1995 | Borgen .................. 380/4 |
| 5,434,919 | A | | 7/1995 | Chaum .................. 380/30 |
| 5,440,640 | A | | 8/1995 | Anshel et al. ........... 380/46 |
| 5,475,756 | A | * | 12/1995 | Merritt ................. 705/73 |
| 5,483,598 | A | | 1/1996 | Kaufman et al. ......... 380/43 |

(Continued)

FOREIGN PATENT DOCUMENTS

JP      411085881 A * 3/1999

OTHER PUBLICATIONS

On the security and Composability of the one time pad, Dominik Raub, date unkknown.*

(Continued)

*Primary Examiner*—James P. Trammell
*Assistant Examiner*—John M. Winter
(74) *Attorney, Agent, or Firm*—David A. Mims, Jr.; Dillon & Yudell LLP

(57) ABSTRACT

Pure random numbers from a sheet within a one-time pad are employed to encrypt the bytes of a source data packet and to order the encrypted bytes in a random order within the encrypted data packet. Pure random numbers fill remaining positions within the encrypted data packet. The resulting encrypted data packet is unconditionally secure (i.e., unbreakable). Sheets within the one-time pad are utilized only once, and the one-time pad is replaced when exhausted. For electronic checking applications, the one-time pad is distributed to the user stored in an electronic checkbook, with a copy retained by the bank. For cellular telephone applications, the one-time pad is stored in a replaceable memory chip within the mobile unit with a copy retained at a single, secured central computer. For client-server applications or applications involving sales over the Internet, the one-time pad may be provided to the user on a floppy disk or CD-ROM, with a copy retained by the vendor.

1 Claim, 8 Drawing Sheets

U.S. PATENT DOCUMENTS

| | | | | |
|---|---|---|---|---|
| 5,493,283 | A | | 2/1996 | Hopper et al. ......... 340/825.34 |
| 5,532,464 | A | * | 7/1996 | Josephson et al. .......... 235/379 |
| 5,539,828 | A | | 7/1996 | Davis ........................... 380/50 |
| 5,677,955 | A | * | 10/1997 | Doggett et al. ............... 705/76 |
| 5,832,087 | A | | 11/1998 | Hawthorne .................. 380/21 |
| 5,838,796 | A | | 11/1998 | Mittenthal ................... 380/28 |
| 5,848,400 | A | * | 12/1998 | Chang ........................ 235/379 |
| 6,047,067 | A | * | 4/2000 | Rosen ......................... 705/68 |
| 6,390,362 | B1 | * | 5/2002 | Martin ....................... 235/379 |
| 6,600,823 | B1 | * | 7/2003 | Hayosh ....................... 380/51 |

OTHER PUBLICATIONS

Bruce Schneier, *Applied Cryptography, Second Edition: Protocols, Algorithms, and Source Code in C* (*cloth*), Jan. 1, 1996, John Wiley & Sons, Inc.

Thierry Moreau, *Message Salting with the Frogbit Algorithm*, May 1997.

* cited by examiner

SECURE ENCRYPTION OF DATA PACKETS FOR TRANSMISSION OVER UNSECURED NETWORKS

This is a Division of application Ser. No. 08/907,298, filed Aug. 6, 1997, abandoned.

BACKGROUND OF THE INVENTION

1. Technical Field

The present invention relates in general to data encryption and in particular to securing data transfers over unsecured channels of communications. Still more particularly, the present invention relates to practical implementation of unbreakable data encryption through one-time use of pure random numbers.

2. Description of the Related Art

Sensitive data transfers are increasingly occurring over networks which are unsecured, such as the Internet or cellular telephone networks. By their nature, the medium by which data transfers are made in such networks must be openly accessible and/or shared, leaving transactions susceptible to interception. The only available alternative for securing data transfers over such networks thus becomes data encryption.

A variety of data encryption schemes have been developed and are implemented for data transfers over networks of the type described. For example, many data encoding schemes employ a reversible encryption algorithm modeled after the Data Encryption Standard (DES). Other data encoding schemes, used alone or in conjunction with DES, employ a combination of public and private keys to encrypt data, such as the Rivest-Shamir-Aldeman (RSA) encryption system used in many commercial software packages. These encoding schemes utilize pseudo-random numbers, or number sequences having a high degree of randomness.

The only encryption system currently recognized as being unconditionally secure is the "one-time pad," also known as a Vernam cipher, developed by Gilbert S. Vernam while working for AT&T in 1917. When properly implemented, the one-time pad encryption mechanism is generally recognized by cryptographic experts to be the only known unbreakable encoding scheme. Other encryption systems are considered cryptographically secure, meaning that the costs associated with breaking the code by pure mathematical methods and extensive computation are very high, although the code can theoretically be broken if enough computing power could be brought to bear. One-time pads are unconditionally secure, meaning that any amount of analysis and computing power is insufficient because there is no pattern in the data.

The two key characteristics of the one-time pad concept which must be adhered to for encryption with a one-time pad to be unconditionally secure are pure randomness and one-time use. Pure randomness is thought to occur in the timing of radioactive decay and in the arrival of cosmic background radiation. The present invention employs one or both of the above sources passed through a cryptographically strong one-way function as the source of random values. Furthermore, the present invention requires that the random sequences thus generated are never intentionally used in more than one embodiment.

Although recognized as being mathematically unbreakable, the one time pad is conventionally considered not to be commercially practical. The reason is principally convenience, since the security of the system requires that the contents of the one-time pad be known only to the proper encrypting and decrypting entities. This requires secure distribution of the one-time pads. Furthermore, the one-time pad, when properly employed, requires large amounts of pure random data for the encryption/decryption values which, by definition, may be used only once. Additionally, since the one-time pad contains only a finite number of random numbers for encryption, replacement of the one-time pad is inevitably required. Finally, the one-time pad encryption method is less ideally suited for encryption of long, variable length messages than alternative, less secure encryption schemes. For these reasons, one-time pads have not been employed up to this time in actual encryption systems for commercial applications, such as banking, cellular telephony, etc.

There do exist classes of problems, however, for which the one-time pad could provide unconditionally secure encryption on a commercial basis. It would be desirable, therefore, to provide a method and apparatus for employing one-time pads in commercial applications requiring encryption of data for transfer over unsecured networks. It would further be advantageous to provide an implementation of one-time pads which could be readily adapted to a variety of commercial data encryption requirements.

SUMMARY OF THE INVENTION

It is therefore one object of the present invention to provide an improved method and apparatus for data encryption.

It is another object of the present invention to provide an improved method and apparatus for securing data transfers over unsecured channels of communications.

It is yet another object of the present invention to provide practical implementation of unbreakable data encryption through one-time use of pure random numbers.

The foregoing objects are achieved as is now described. Pure random numbers from a sheet within a one-time pad are employed to encrypt the bytes of a source data packet and to order the encrypted bytes in a random order within the encrypted data packet. Pure random numbers fill remaining positions within the encrypted data packet. The resulting encrypted data packet is unconditionally secure (i.e., unbreakable). Sheets within the one-time pad are utilized only once, and the one-time pad is replaced when exhausted. For electronic checking applications, the one-time pad is distributed to the user stored in an electronic checkbook, with a copy retained by the bank. For cellular telephone applications, the one-time pad is stored in a replaceable memory chip within the mobile unit with a copy retained at a single, secured central computer. For client-server applications or applications involving sales over the Internet, the one-time pad may be provided to the user on a floppy disk or CD-ROM, with a copy retained by the vendor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
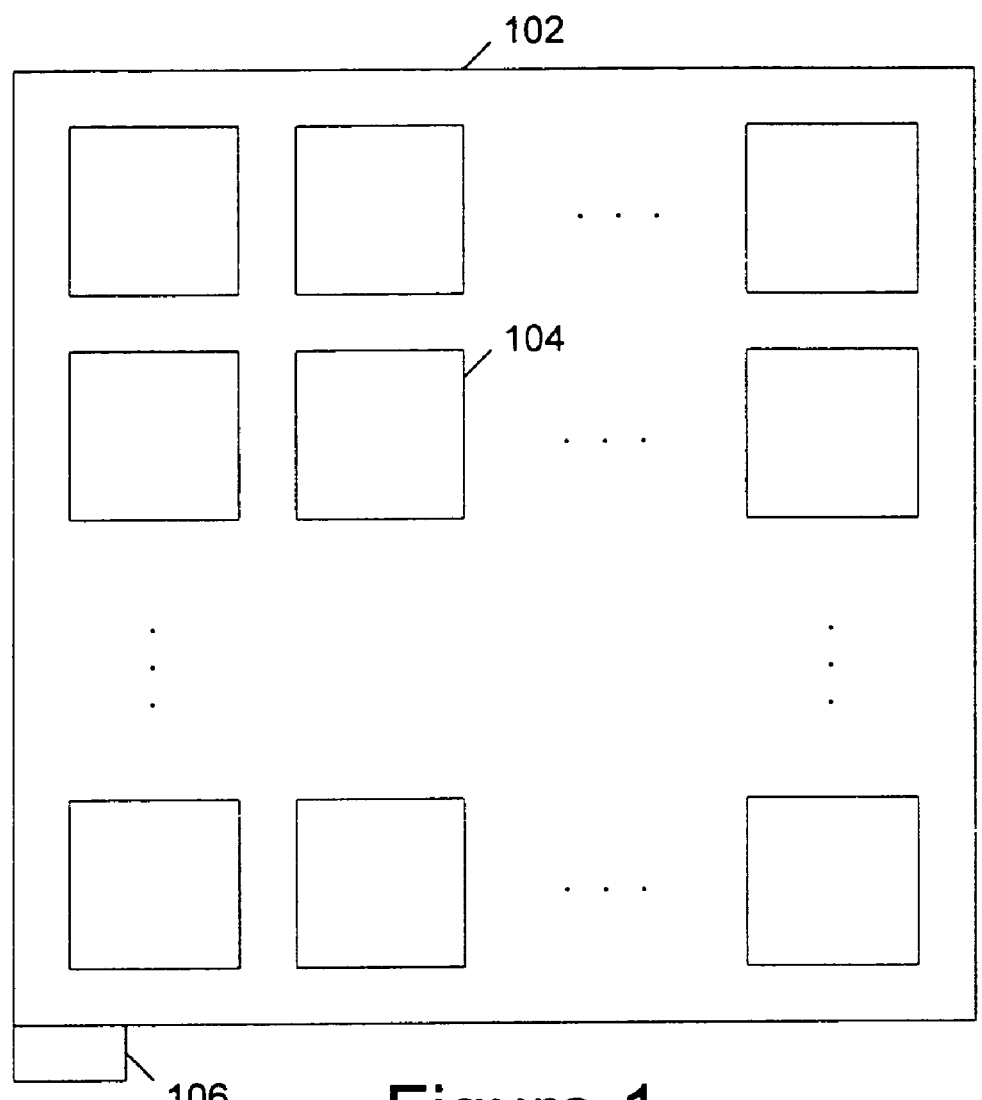
FIG. 1 depicts a block diagram of a one-time pad in accordance with a preferred embodiment of the present invention.

With reference now to the figures, and in particular with reference to FIG. 1, a block diagram of a one-time pad in accordance with a preferred embodiment of the present invention is depicted. One-time pad 102 is maintained in a memory, such as a read only memory (ROM) or a hard disk drive, and includes a plurality of sheets 104. Each sheet 104 contains a plurality of pure random numbers sufficient for encryption of a known, fixed length (N) data packet. Each sheet 104 is not intentionally used in the implementation of any other one-time pads such as one-time pad 102.

Figure 2:
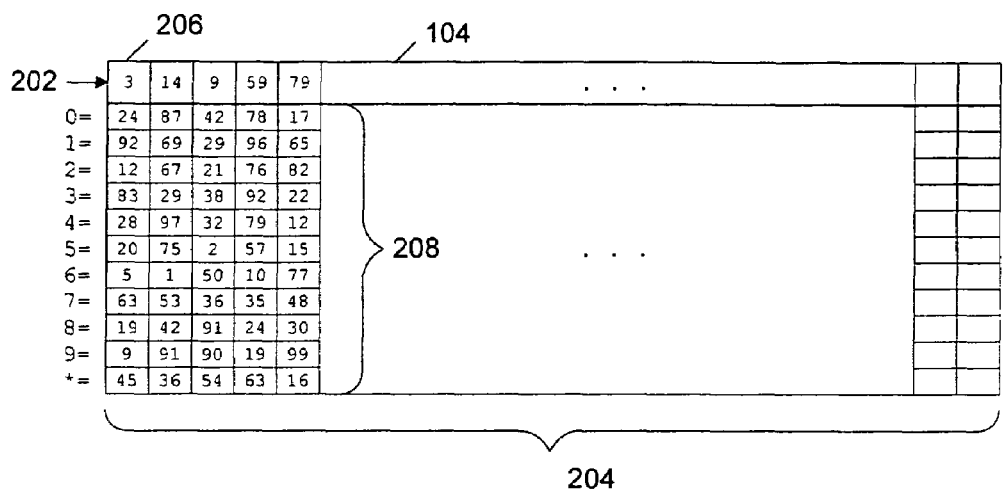
FIG. 2 is a diagram of the contents of a sheet within a one-time pad in accordance with a preferred embodiment of the present invention.

Referring to FIG. 2, a diagram of the contents of a sheet within a one-time pad in accordance with a preferred embodiment of the present invention is illustrated. Each sheet 104 contains a string 202 of N pure randomly-ordered numbers in the range of 1 to N. Each sheet 104 also contains a plurality of corresponding arrays 204. Number string 202 is a non-repeating sequence of numbers within the predetermined range N corresponding to the number of characters or positions in the encrypted data packet. For example, if the encrypted data packet will have five hundred positions, the numerals 1 through 500 will be randomly ordered and placed in string 202. Individual numbers within string 202 are employed to identify the position for a corresponding byte of data in the encrypted data packet. For example, the first number 206 within string 202 designates the position within the encrypted data packet in which the first byte of source data will be placed after encryption.

Each individual number within string 202 has an associated array within array set 204. Each array 208 contains a non-repeating sequence of random numbers comprising a character map to be employed for the character in the respective position. For the sake of simplicity and clarity of explanation, the exemplary embodiment depicts only the mapping for numeric characters 0–9 and a delimiter ("*"). However, the mapping may easily be extended to include alphabetic or text characters merely by increasing the size of arrays 204. The arrays 204 essentially comprise encryption instructions for data packets not exceeding the length of position string 202.

The characters or values within a character map array 208 for a given position are randomly generated subject only to the constraint that the same value may not appear twice in a given array. However, the same value may appear many times within different arrays in array set 204. In fact, 128 different characters can be encoded in each byte comprising map array 208. While the exemplary embodiment depicts only numerals less than 100 in arrays 204, any set of 128 unique characters may be employed to form the character maps, including alphanumeric characters and special characters (colons, hyphens, dashes, quotation marks, punctuation, etc.).

The fact that only 128 different characters can be represented within any one byte of array 208 creates a limitation on the encryption of double byte based text that occurs in Asian languages. However, the present invention is likely to find its widest commercial use in short, fixed length, numeric related applications such as electronic checking, position reporting, and client-server authentication and verification. Since the present invention is not intended for widespread use in text encryption, the exemplary embodiment illustrates a single byte approach. However, those skilled in the art will quickly understand that the present invention can be extended to include double byte encoding.

As described, the character map values within each array 208 in array set 204 are random numbers, and the sequence of numbers in string 202 is randomly ordered. Two sources of "randomness" are thought to exist: the time period associated with electronic emission/decay for a single radioactive particle and the level of background radiation originating from space. Methods for generating pure random numbers are well-known in the art, and include measuring the random time intervals associated with radioactive decay or cosmic background radiation and passing these measurements through a one-way hash function. These methods may be employed in known manners for generating values for the character maps in arrays 204, for randomly ordering numbers within string 202, and for filling the unused bytes of the encrypted data packet.

Referring again to FIG. 1, the requirement that true random numbers be employed in sheets 104 within one-time pad 102 cannot be circumvented for convenience. Pseudo-random numbers, which are usually generated from a seed value using a hash function, are not acceptable substitutes since an estimate of the seed value may be employed to derive the hash function required to duplicate the resulting pattern. With a fairly accurate estimate of the seed value, the number of mathematical operations required to crack the encryption mechanism becomes workable. The vulnerability of pseudo-random numbers, even those believed to be cryptographically secure, has been demonstrated where the time and process id have been used in the key of popular software security features.

One-time pad 102 may also include counter 106 identifying the next sheet 104 which may be utilized for encryption or decryption. Both the encrypting and decrypting entities are provided with identical copies of one-time pad 102 through a secure medium such as hand-delivery. As sheets 104 within one-time pad 102 are utilized, counter 106 is advanced to point to the next available sheet. When counter 106 contains a value exceeding the number of sheets 104 within one-time pad 102, one-time pad 102 is depleted and must be replaced.

The requirement that a given sheet 104 within one-time pad 102 be used only once and never be reused is critical. Reuse of sheets 104 within one-time pad 102 compromises the security of the resulting encrypted data packet. It is intended that data packets encrypted by the method provided in the present invention could be accompanied by the plain text of the source packet, and still be invulnerable to cryptographic attack. Reuse of sheets 104 would prohibit this level of unconditionally secure encryption.

Figure 3:
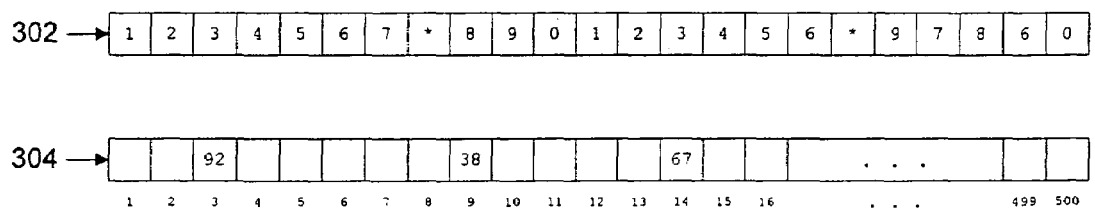
FIG. 3 depicts an example of data encryption utilizing a one-time pad in accordance with a preferred embodiment of the present invention.

With reference now to FIG. 3, an example of data encryption utilizing a one-time pad in accordance with a preferred embodiment of the present invention is depicted. Source data packet 302 contains a string of characters comprising the message to be encrypted for transmission. Again, while the exemplary embodiment depicts only numeric characters and a delimiter, the process described may be readily applied to expanded character sets.

Furthermore, the order in which the pure random numbers are used from sheet 104 within a specific one-time pad 102 can be varied depending on a particular customer or implementation. The same encoding/decoding software is simply placed in the one-time pad device and the decoding computer. This allows for further security through the ability to physically secure the one-time pad and the encoding/decoding software separately. The ability to separate responsibilities is one key method used in the prevention of theft by inside employees. In the exemplary embodiment, one particular pattern is followed for illustrative purposes.

The encrypted data packet 304 contains positions for the encrypted bytes of source data packet 302, with five hundred positions depicted in the exemplary embodiment. The value of the first numeral in the position string of a sheet in the one-time pad is utilized to determine the position of the first encrypted byte. Utilizing the example depicted in FIG. 2, the first encrypted byte of source data packet is to be placed in position 3. The value of the first byte within source data packet is looked up in the associated character map for position 3, and the encrypted value "92" is entered in encrypted data packet 304 at position 3. Similarly, the value "67" is entered in position 14 and the value "38" is entered in the ninth position of encrypted data packet 304 to encode the second and third bytes of source data packet 302, respectively. This encryption process continues until all bytes of source data packet 302 have been encrypted.

When all bytes of source data packet 302 have been processed and an encryption value placed in the appropriate position of encrypted data packet 304, the remaining positions are filled. The remaining positions may be filled with pure random numbers from the sheet of the one-time pad being employed. The positions within the encrypted data packet 304 which do not contain values from the source data packet 302 are used for authentication, verification, and disinformation.

When expanded to include the full character set, the secure encryption mechanism of the present invention possesses the ability to randomly encode each byte of a source data packet in at least 128 different ways. Furthermore, any character of data may be placed in any of the positions within the encrypted data packet. Thus, each character of data may be encrypted in hundreds of thousands of different ways, depending on the length of the encrypted data packet, with each character entirely independent of any other character. There exists no pattern in either the encoding of a character or its position within an encrypted data packet, nor is there any pattern between distinct encrypted data packets. The encoding and position mappings are known only to entities possessing a copy of the one-time pad and knowing which sheet was employed for encryption. No human intervention is required for either the random number generation, encoding, or decoding processes. Once a sheet within the one-time pad has been used, that sheet is never intentionally used again, although theoretically the same sheet may be randomly generated again within another one-time pad.

The feature of randomly ordering encrypted byte within the encrypted data packet is not found in conventional one-time pads, which are simple look-up tables for each character or word placed in order in the encrypted message. Thus, the present invention provides greater security than conventional one-time pads. Furthermore, the starting location for the position string and arrays may be varied from one-time pad to one-time pad. For example, one one-time pad may begin with the fifth numeral in the position string, while another begins with the fifty-third numeral.

It should be noted that the "arrays" described above are simple constructs used for convenience in describing the invention. Other methods of employing random numbers to encrypt the source data may be employed instead of or in addition to character maps, including XORing the bits of a random number with the bits of the character or word being encrypted.

Figure 4:
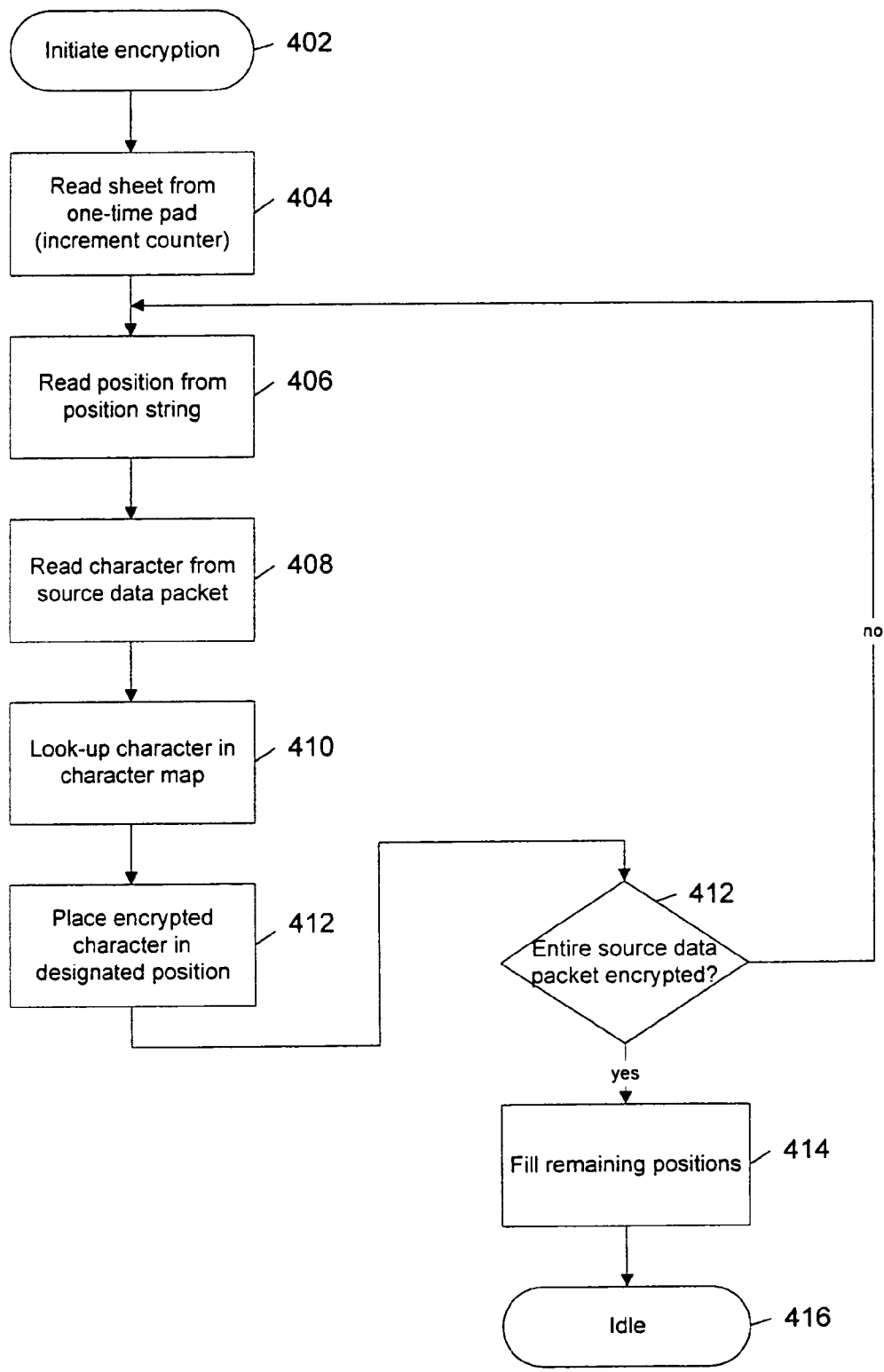
FIG. 4 is a high level flowchart for a process of encrypting data in accordance with a preferred embodiment of the present invention.

Referring to FIG. 4, a high level flowchart for a process of encrypting data in accordance with a preferred embodiment of the present invention is illustrated. The process begins at step 402, which depicts initiation of the encryption process by a transmitting entity preparing to transmit a source data packet over an unsecured network. The process then passes to step 404, which illustrates reading a sheet from the one-time pad and, if the one-time pad is equipped with a counter, incrementing the counter.

The process next passes to step 406, which depicts reading a position indicator from the positions string, and then to step 408, which illustrates reading the next character to be encrypted from the source data packet. The process passes next to step 410, which depicts looking up the character to be encrypted in the character map associated with the position identified by the position indicator. The process then passes to step 412, which illustrates placing the encrypted character associated in the character map with the character read from the source data packet in the position designated by the position indicator read from the position string.

The process then passes to step 414, which depicts a determination of whether the entire source data packet has been encrypted. If not, the process returns to step 406 for encryption of additional characters from the source data packet as described above. If so, however, the process proceeds to step 414, which illustrates filling the remaining positions in the encrypted data packet. As described above, the remaining positions may be filled with information encrypted with pure random numbers for authentication, verification, or disinformation purposes.

Once the entire encrypted data packet is filled, the process passes to step 416, which depicts the process becoming idle until another data packet requires encryption. The data packet encrypted by the process described may be securely transmitted over unsecured networks without danger of being compromised.

Figure 5:
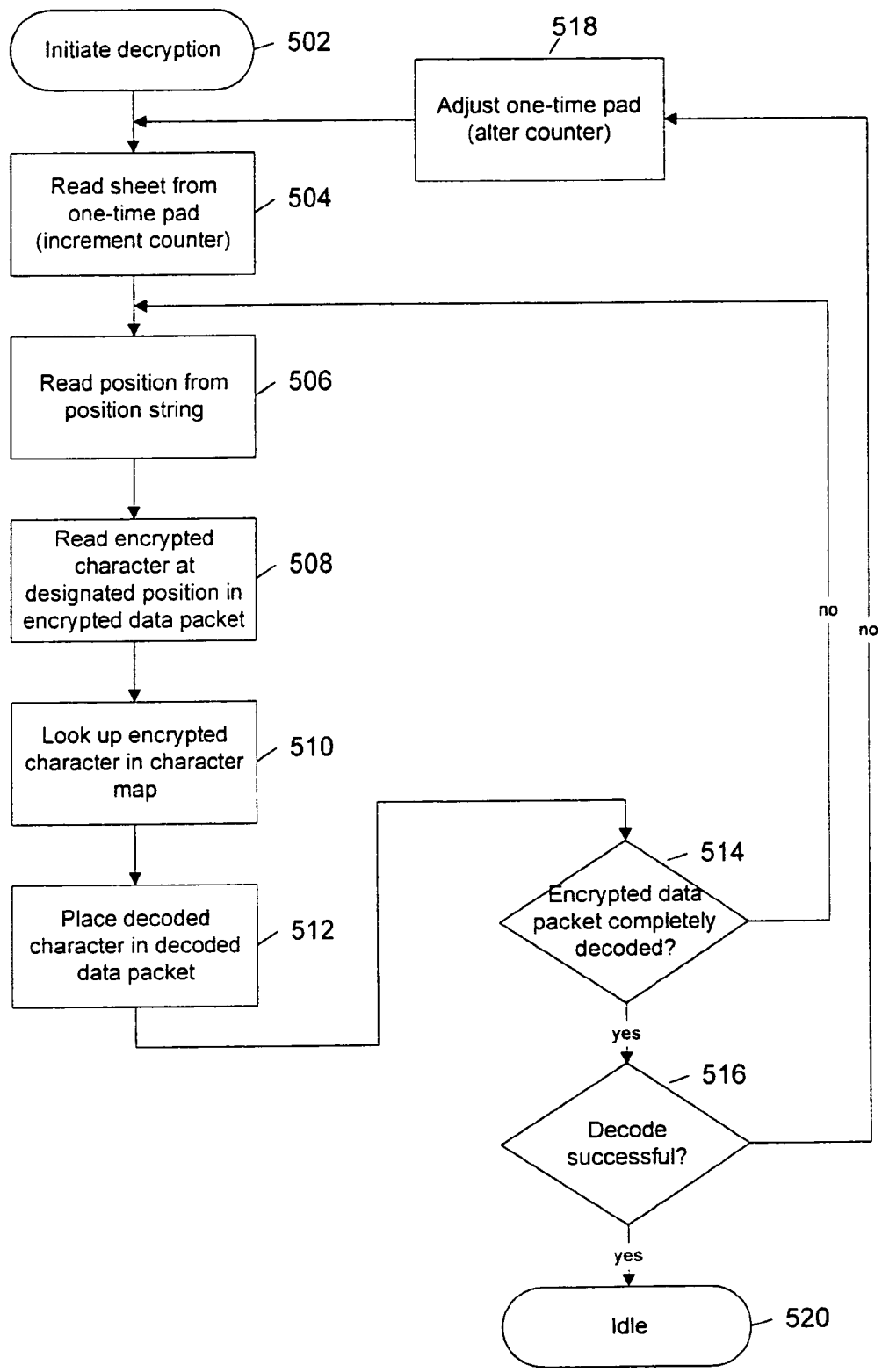
FIG. 5 depicts a high level flowchart for a process of decoding data in accordance with a preferred embodiment of the present invention.

With reference now to FIG. 5, a high level flowchart for a process of decoding data in accordance with a preferred embodiment of the present invention is illustrated. The process begins at step 502, which depicts initiation of the decryption process in response, for example, to receipt of an encrypted data packet. The process then passes to step 504, which illustrates reading the next available sheet from the one-time pad and, if the optional counter is present, incrementing the counter.

The process next passes to step 506, which depicts reading the first (or next) position in the position string within the one-time pad sheet, and then to step 508, which illustrates reading the encrypted character at the position within the encrypted data packet designated by the position indicator read. The process passes next to step 510, which depicts looking up the encrypted character in the character map associated with the designated position to determine the decoded character. The process then passes to step 512, which illustrates placing the decoded character in the next available position within the decoded data packet.

The process then passes to step 514, which depicts a determination of whether the encrypted data packet has been completely decoded. This determination may be made, for example, based on whether an expected number of characters have been decoded from the encrypted data packet, or on whether a stop character and expected fill characters have been encountered. If further decoding is required, the process returns to step 506 for decryption of additional characters within the encrypted data packet.

A determination of whether the decode was successful may simply involve checking the decoded data packet for a stop character, checking for a known number of characters to be decoded, or may involve looking for an expected authentication or verification character sequence ("watermark" or "signature") within the decoded data packet. When the message has been decoded, the fill characters are checked for authentication and verification purposes.

If the decode was not successful, the process may optionally proceed to step 518, which illustrates adjusting the one-time pad employed in the decryption process in an attempt to resynchronize the one-time pads employed by the transmitting and receiving entities. This may be achieved, for example, by adjusting the counter value to compensate for the receiving entity being behind the transmitting entity, the most likely source of error in synchronization. If the counter was incremented in the last decryption attempt, the decrypting process may simply be attempted again.

To avoid the potential for synchronization errors in utilizing sheets within the one-time pad, an alternative procedure is to have the decryption process check the fill characters in adjacent sheets for authentication and verification purposes prior to decoding.

Referring again to step 516, if the data packet was successfully decoded, the process proceeds instead to step 520, which depicts the process becoming idle until decryption of a received data packet is once again required.

Figure 6:
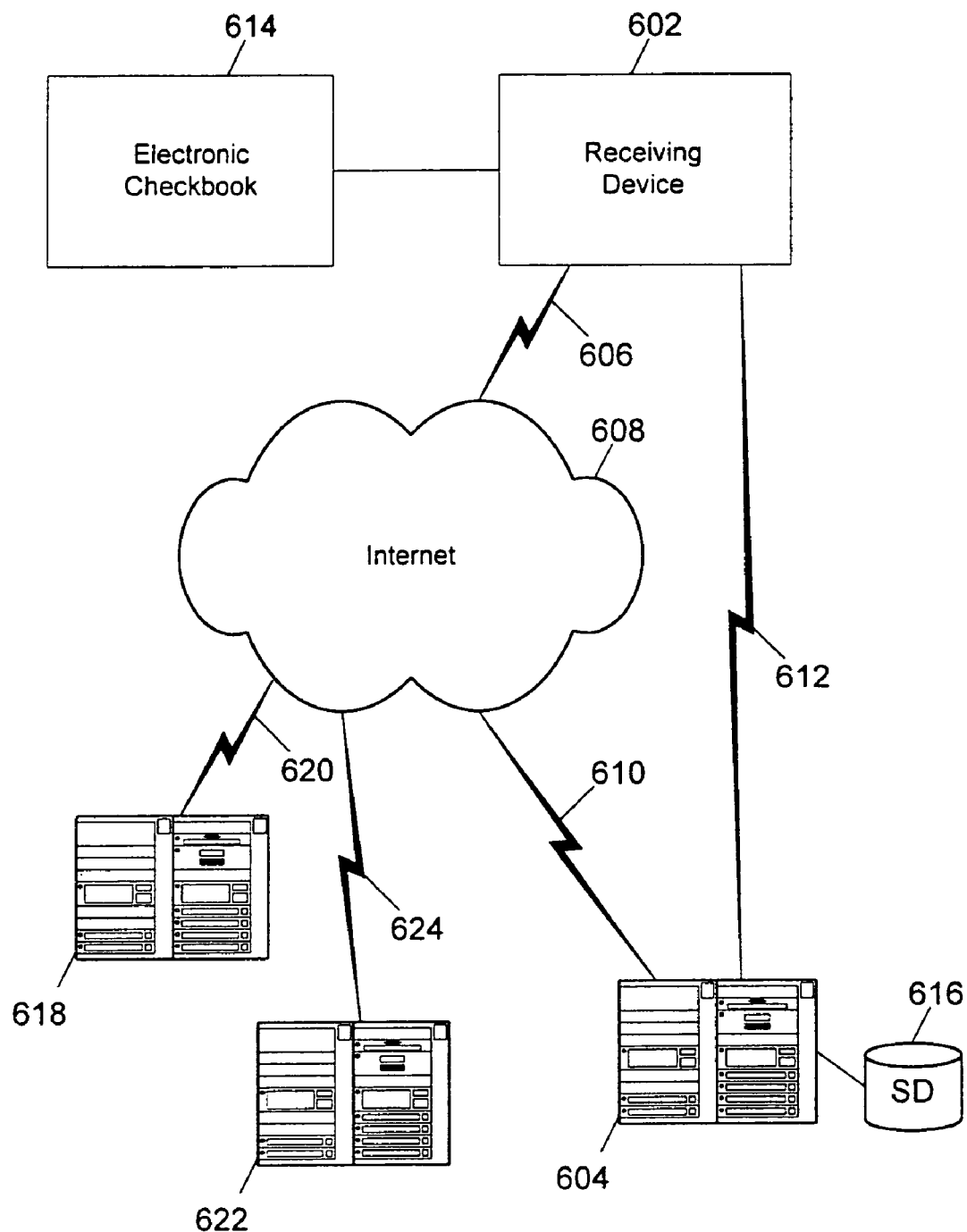
FIG. 6 is a diagram of an electronic checking environment in which secure encryption in accordance with a preferred embodiment of the present invention may be implemented.

Referring to FIG. 6, an electronic checking environment in which secure encryption in accordance with a preferred embodiment of the present invention may be implemented is depicted. The electronic checking environment depicted includes a receiving device 602 located at the merchant's place of business which is connected to a server 604 located at the customer's bank. Receiving device 602 may be connected via communications link 606 to the Internet 608, which is in turn connected via communications link 610 to server 604, such that electronic checks are processed via the Internet. Alternatively, receiving device 602 may be directly connected to server 604 via communications link 612, which may provide dial-up access or the like.

An electronic checkbook 614 is capable of being selectively attached to receiving device 602. The term "electronic checkbook" is used herein to refer to a collection of fixed length randomly encoded data packets, regardless of the medium in which such packets are held, together with the instructions for encrypting. Similarly, the term "electronic check" is used herein to refer to a single fixed length randomly encoded data packet encrypted utilizing the corresponding sheet from a one-time pad. Each electronic check within an electronic checkbook is utilized only once.

The electronic checks generated by electronic checkbook 614 would contain, in an encrypted data packet, information such as the amount, the payee's account number, and the customer's signature. The signature may comprise a simple password, or may be a fingerprint, retina scan, or any other positive means of identification. The number of bytes required to encode a check's confidential information should be on the order of 100 bytes, although each electronic check may be on the order of a few hundred bytes with the unused bytes filled with additional characters as described above.

When an individual first becomes a customer of a bank, or reorders checks, the bank supplies the customer with electronic checkbook 614, with bank routing and account identification associated with the electronic checks. Electronic checkbook 614 may include a reorder form for automatic reorder when the number of remaining checks falls below a certain number. The customer may select a password or personal identification number (PIN), i.e., signature, to be associated with the electronic checks as is currently done for automated teller machine (ATM) access.

The collection of data packets comprising electronic checkbook 614 are contained within a suitable form of electronic memory encased in a hard case or other suitable durable means of protecting the memory. The electronic checkbook 614 may be a simple memory device such as a type of Personal Computer Memory Card International Association (PCMCIA) card capable of being inserted into receiving device 602. Receiving device 602 may thus be equipped with a keyboard and display (not shown) for user interaction and the capability of reading electronic checks from electronic checkbook 614, encrypting transaction information utilizing the associated sheet from a one time pad, and transmitting the encrypted data packet for the transaction while deleting the one-time pad sheet from any local or internal memory in receiving device 602. For additional security, the encryption could occur only within the PCMCIA card. However, this method allows for the possibility of the checkbook owner's password being compromised, which is not the preferred embodiment of the present invention.

Alternatively, in the preferred embodiment of the present invention, electronic checkbook 614 could be a relatively simple device allowing for write-only transmission of encrypted data packets. That is, no capability to read its contents would exist. A small keyboard, a small display, and a single port would be required, with electronic checkbook 614 inserted into receiving device 602 when preparing to write an electronic check. Receiving device 602 may be located at the merchant's place of business or be connected to a customer's computer for transactions over the Internet. The payee and the amount could be automatically provided by receiving device 602, with the customer entering a password and pressing a write button when the correct payee and amount are displayed. The electronic check would then be written to receiving device 602, which would transmit the electronic check to server 604 for processing.

As still another alternative, electronic checkbook 614 may be downloaded into a device possessed by the customer, such as a personal digital assistant (PDA). Electronic checkbook 614 could be downloaded to the customer's PDA at the time the account is opened, with checks replenished without human interaction at ATM's modified to include a port for this purpose. Therefore, check replenishment would be readily available 24 hours a day.

Server 604 located at the customer's bank is connected to a storage device 616 containing the other copy of the one-time pad utilized to encrypt the confidential information within the electronic check and an authorized check list associating electronic checks with sheets of the one-time pad. The electronic checking environment may also include a second server 618 located at the payee's bank connected to Internet 608 by communications link 620, and a third server 622 located at a clearinghouse connected to Internet 608 via communications link 624. In this manner, the electronic checks may be passed among all entities concerned via Internet 608 without generating any paper.

By encrypting the electronic checks using a one-time pad in accordance with the present invention, the plain text of at least a portion of the encrypted message—such as the amount, the payee, etc.—may accompany the encrypted electronic check and the encrypted data would still be invulnerable to cryptographic attack. Knowledge of a portion of the message encrypted, even if accompanied by knowledge of the ordering of these portions within the source message, is of no benefit in attempting to break the encrypted message. Thus, authentication and verification codes required to validate the electronic check would remain encrypted in an unbreakable manner.

An additional level of security may be introduced by varying the starting location used for the position string between electronic checkbooks (i.e, starting with the seventh random number in the string in one electronic checkbook while starting with the thirty first random number in a different electronic checkbook). The responsiblity for generating the random numbers for the one-time pad may thus be separated from the responsibility for selecting a starting location within the position string and arrays to be employed by a particular one-time pad, increasing the difficulty of employee theft of the information. An electronic checkbook may be manufactured and filled with one-time sheets by one entity, and programmed with a randomly selected starting location within the position string by a different entity.

Figure 7:
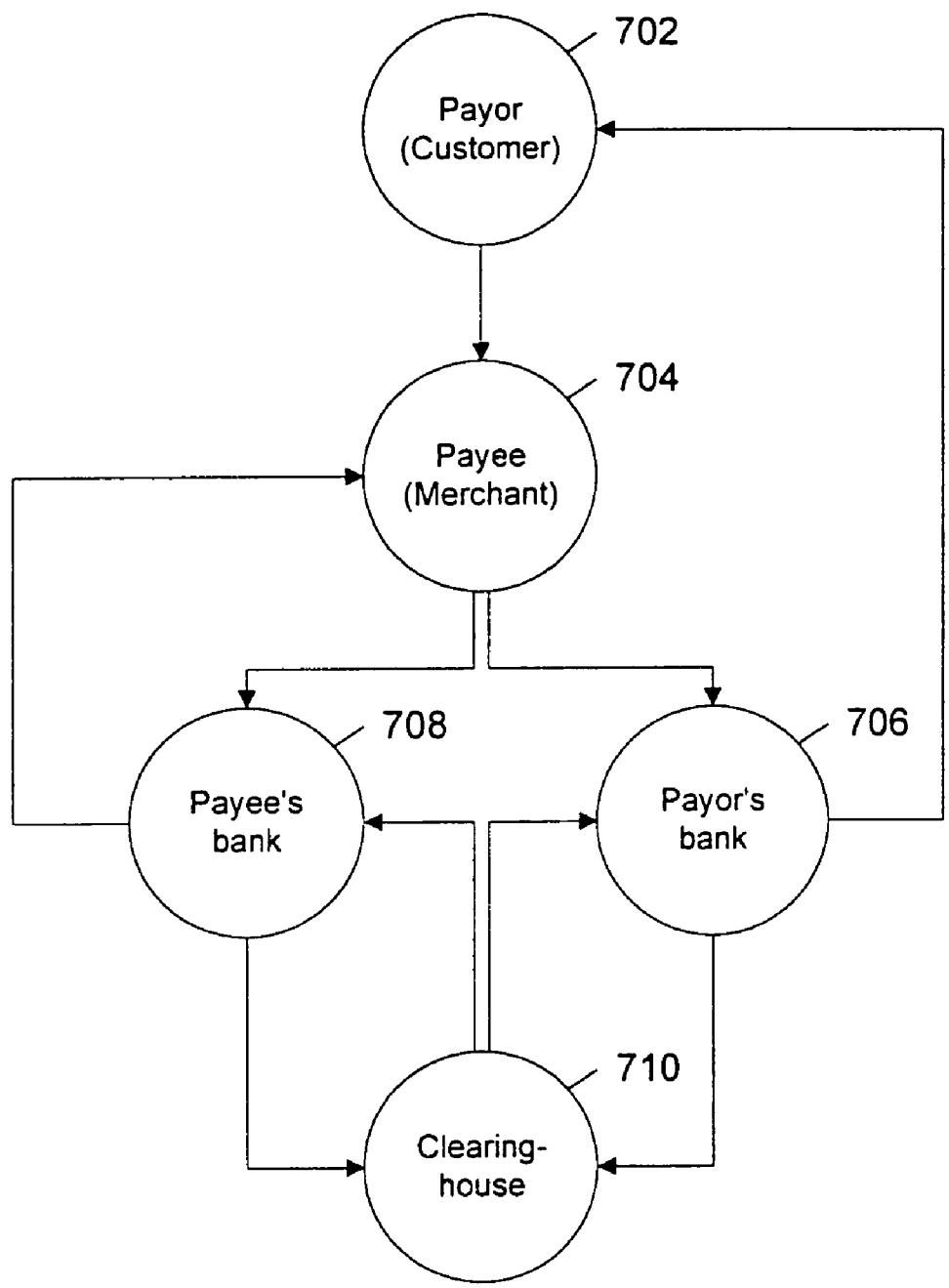
FIG. 7 depicts a data flow diagram for a process of utilizing electronic checks in accordance with a preferred embodiment of the present invention.

With reference now to FIG. 7, a data flow diagram for a process of utilizing electronic checks in accordance with a preferred embodiment of the present invention is depicted. The merchant or payee supplies the merchant's account identification and an amount to the payor through a receiving device. The electronic check, an encrypted data packet such as described above, is generated by the customer or payor 702 and transmitted to the merchant or payee 704. Merchant 704 appends the merchant's bank routing and account identification numbers to the electronic check, then routes the electronic check to both the payor's bank 706 and the merchant's or payee's own bank 708.

Payor's bank 706 is the only place where the electronic check can be decoded. When payor's bank 706 receives the electronic check, payor's bank 706 decodes the electronic check, verifies and authenticates the check, checks the balance of the payor's account, freezes the amount indicated in the electronic check within the payor's account, and electronically forwards the electronic check, with the appended payee account information, to clearinghouse 710 together with a coded authorization for payment of the indicated amount to the payee.

At the same time, when payee's bank 708 receives the check, payee's bank 708 marks the payee's account as pending receipt of a deposit and forwards the check to clearinghouse 710. Clearinghouse 710 compares the two (encrypted) electronic checks received from payor's bank 706 and payee's bank 708. If they match, clearinghouse subtracts the indicated amount from the clearing account of payor's bank 706, adds the indicated amount to the clearing account of payee's bank 708, notifies payor's bank 706 that the electronic check has been settled, and notifies payee's bank 708 that the electronic check has been settled with the indicated amount placed in the clearing account of payee's bank 708.

On receipt of the notice from clearinghouse 710, payor's bank 706 subtracts the indicated amount from the payor's account, removes the electronic check from the payor's authorized check list, and notifies the payor 702 that the check has been settled. The payor's electronic checkbook may then remove the used electronic check from the set of available electronic checks. Meanwhile, on receipt of the notice from clearinghouse 710, payee's bank 708 adjusts the payee's account by the indicated amount and notifies payee 704 that the check has been settled.

At this point, the transaction is complete. The elapsed time for the transaction could be very short. Bottlenecks will occur primarily from limited bandwidth at the retail counter and within the Internet. Bandwidth problems at the retail counter may be alleviated by using parallel receiving devices.

Use of electronic checks over the Internet, directly from a customer's home, would operate in a similar fashion. However, the customer must send a copy of the electronic check to the merchant. Moreover, a number of additional features could be added to the electronic checking system, such as the ability to directly deposit electronic checks to and/or through the customer's electronic checkbook.

The electronic checking environment of the present invention would allow the current, paper-based checking system to be electronically emulated, while providing greater security than that available in the current paper process. The ease of understanding and heightened security will facilitate earlier and faster adoption of electronic checking. The current clearinghouse function will persist in an electronic form, and current banking laws, regulations, and procedures may be applied. The present invention also allows paper checks and electronic checks to coexist during a transition period to pure (or majority) electronic banking.

Figure 8:
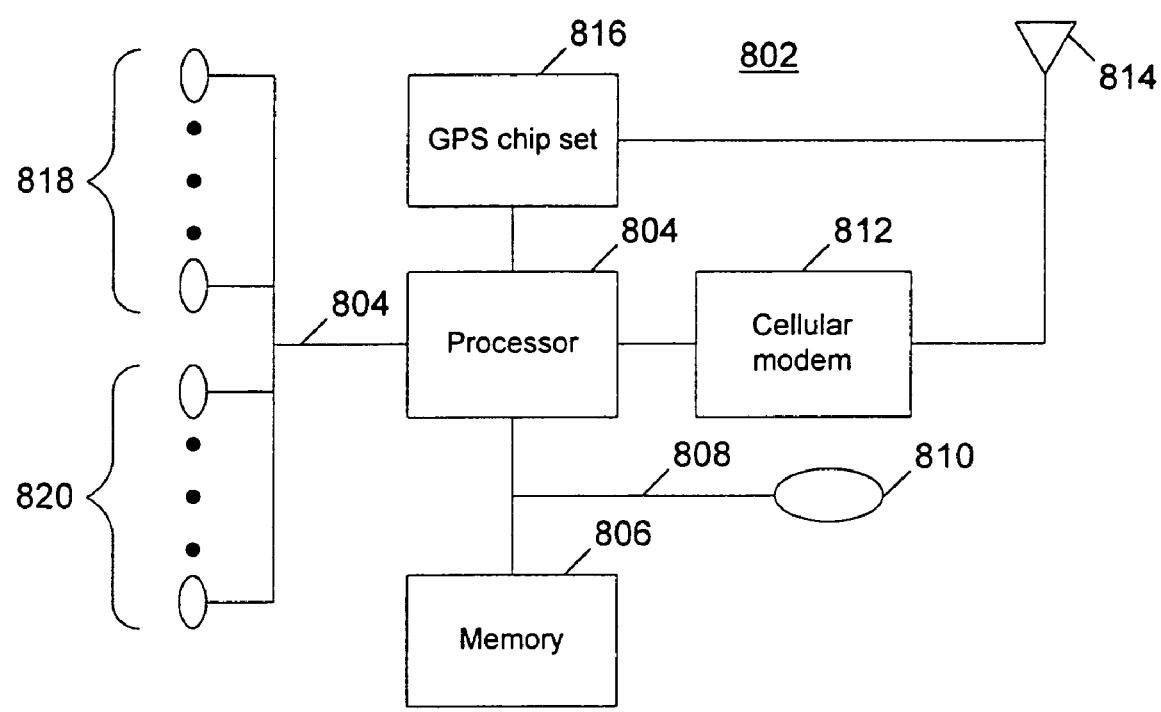
FIG. 8 is a block diagram of a cellular communications global transponder in which a preferred embodiment of the present invention may be implemented.

Referring to FIG. 8, a block diagram of a cellular communications global transponder in which a preferred embodiment of the present invention may be implemented is illustrated. Global transponder 802 is a device which automatically returns a data packet containing the latitude and longitude of the location of global transponder 802 in response to receiving a cellular telephone call. The data packets may be transmitted over non-secure, commercial cellular phone circuits such as those provided by the Iridium Project, which provides global cellular communications to and from any spot on earth.

Global transponder 802 includes processor 804 connected to memory 806. The connection may be in the form of a system bus 808, which is also connected to an external port 810 for programming or communication with other devices. Processor 804 is also connected to cellular modem 812, which is connected in turn to antenna 814. Processor 804 and antenna 814 are also both connected to global positioning system (GPS) chip set 816. Such GPS chip sets are available from a number of commercial sources. GPS chip set 816 preferably returns GPS fix data in the NMEA-0183 ASCII RS232 format. Sensors 818 and switches 820 connected to processor 804 provide sources of data and control, respectively, for global transponder 802.

Global transponder 802 automatically returns a data packet in response to a cellular phone call from a central computer (not shown). The content of the data packet that is returned varies depending on the content of the request packet originating from the central computer. In general, the data packet returned will include GPS latitude and longitude information, and may also include sensor data and/or information regarding the object to which global transponder 802 is attached.

When a cellular phone call is received, modem 812 automatically answers and receives the request packet, transmitting the request packet to processor 804. Processor 804 examines the request packet and determines what response packet should be sent. GPS fix data from GPS chip set 816 is stored in memory 806, as is data from sensors 818. Processor 804 extracts the appropriate information from memory 806 for the response packet, forwarding the response packet to modem 812 for transmission. Although the latitude and longitude may be transmitted in approximately 20 digits, the data packets returned may be any fixed length. The data packets could easily be a few hundred bytes long and still be transmitted, in burst mode, in a very short time interval (on the order of one second).

There are times when the data packets returned by global transponder 802 must be protected, as in the case of a downed military pilot. Therefore, the one-time pad of the present invention may be employed to encrypt the data packet. A portion of memory 806 may be a microchip containing the one-time pad. When the latitude/longitude of global transponder 802 is required, the central computer dials cellular phone number of global transponder 802 and transmits a request packet comprised of a previously determined pattern of random characters. Processor 804 compares the pattern in the request packet to patterns associated with valid sheets of the one-time pad, copies of which are only in global transponder 802 and the central computer.

If processor 804 fails to identify a match with patterns associated with the one-time pad, then global transponder 802 simply terminates the cellular telephone connection without returning a data packet. Global transponder 802 may also record the date and time of the attempted contact. On the other hand, if a match to the pattern in the request packet is determined, processor 804 generates a data packet containing the latitude and longitude encrypted using the sheet of the one-time pad which is associated with the pattern from the request packet. This data packet is then returned to the requesting entity (i.e., the central computer).

Upon receiving the encrypted data packet, the central computer validates the packet by comparing bytes not containing latitude/longitude information with bytes expected to be returned in response to the request packet. If the packet is valid, the central computer extracts and decodes the encrypted latitude and longitude information.

In order to prevent jamming by repeatedly calling the phone number utilized by global transponder 802, it may be desirable to associate a unique phone number with each sheet in the one-time pad. Thus, global transponder 802 would respond to any of the phone numbers associated with sheets in its one-time pad. In addition, for military applications, buttons may be added to allow a downed pilot to indicate his/her physical condition, the state of enemy activity, and whether his/her capture is imminent. The sensors might be used to transmit the pilot's vital signs, such as heart rate.

Additionally, functionality may be added to allow the pilot to transmit the information without waiting for an incoming cellular phone call, or to indicate whether the device had fallen into enemy hands.

Since the one-time pad and the cellular phone numbers are hard-coded into memory 806 of global transponder 802, this information cannot be leaked and reverse engineering would not yield any substantive information. The use of commercial connections reduces the cost while providing, with encryption, the same or a better level of security. Fly-overs would not be required since the pilots exact location could be identified, reducing the potential for conflict or compromise of the pilot's location.

Figure 9:
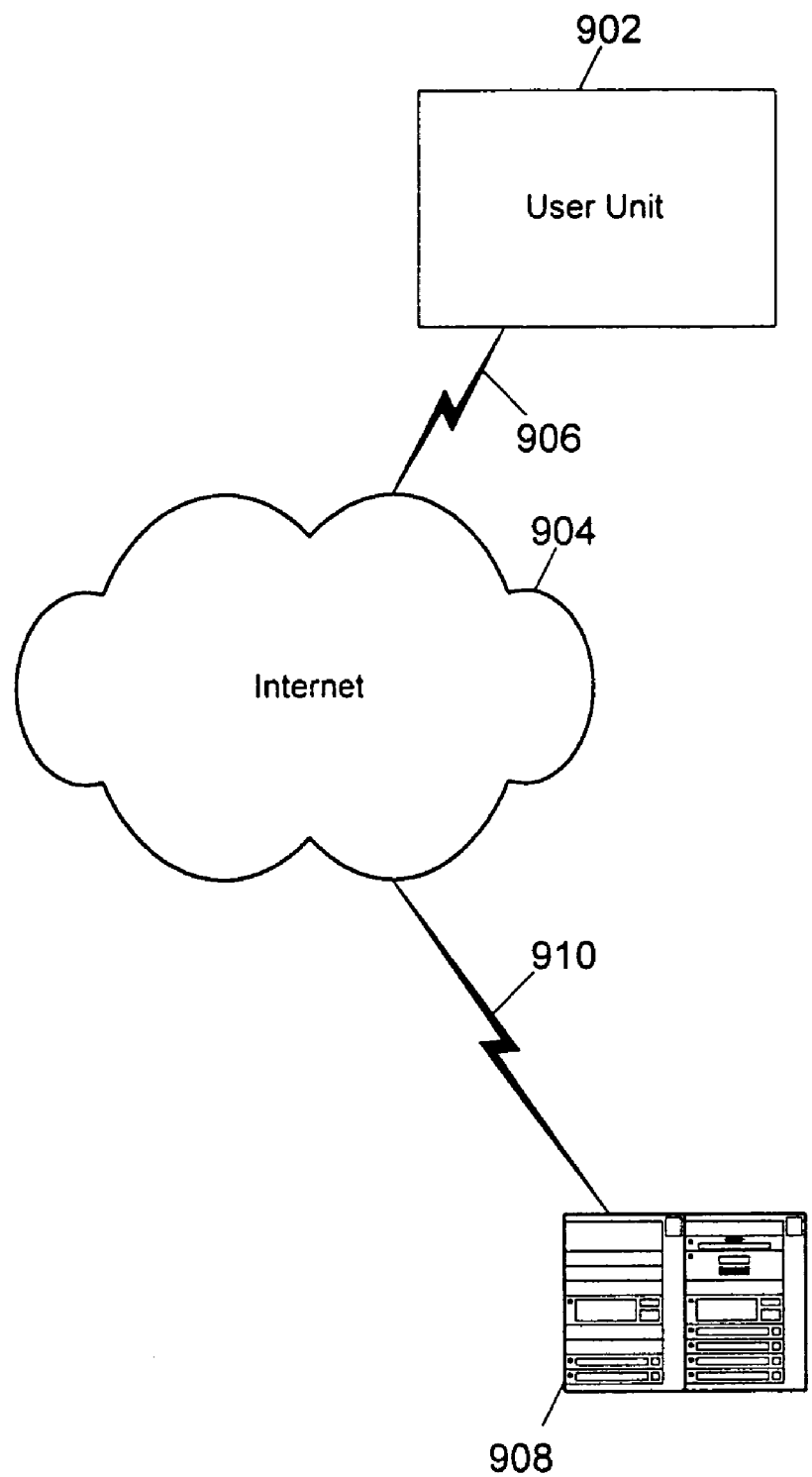
FIG. 9 depicts an Internet sales environment in which a preferred embodiment of the present invention may be implemented.

With reference now to FIG. 9, an Internet sales environment in which a preferred embodiment of the present invention may be implemented is depicted. The Internet sales environment includes a user unit 902 connected to the Internet 904 by communications link 906, which may for example be access through an Internet service provider (ISP). A server 908, which may be a HyperText Transmission Protocol (HTTP) server, is located at the vendor's facilities and is also connected to Internet 904 via communications link 910. User unit 902 may include a browser, an application designed to submit HTTP requests and display information formatted in the HyperText Markup Language (HTML). Thus, transactions in the Internet sales environment depicted may be conducted over the World Wide Web (WWW).

The vendor may provide a one-time pad to potential customers. For example, a company selling software may provide a one-time pad to a customer setting up an account to order upgrades or new products over the Internet. Alternatively, the user's credit card company may provide a one-time pad for use in conducting transactions over the Internet. Sales orders transmitted over the Internet 904, or at least confidential information within sales orders, are encrypted by user unit 902, and are either decoded by the vendor, if the one-time pad originated from the vendor, or forwarded by the vendor to the credit card company for decoding and payment authorization.

Alternatively, the one-time pad may be employed in client-server environments for authentication and verification purposes. In this alternative, a vendor might be able to deliver software customized for a particular environment after receipt of a data packet encrypted using a one-time pad previously sold to the customer.

It is important to note that while the present invention has been described in the context of fully functional systems, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

The invention claimed is:

1. A method of processing an electronic check, comprising:

receiving an electronic check encrypted using a one-time pad at a business;

transmitting an encrypted first copy of said electronic check to a payor's bank and an encrypted second copy of said electronic check to a payee's bank;

decoding said encrypted first copy of said electronic check at said payor's bank using a copy of said one-time pad;

authenticating said electronic check;

transmitting said encrypted first copy of said electronic check over an unsecure communication link to a clearinghouse with a payment authorization;

transmitting said encrypted second copy of said electronic check over an unsecure communication link to said clearinghouse;

comparing, at said clearinghouse, said encrypted first copy of said electronic check that has been transmitted over an unsecure communication link to said encrypted second copy of said electronic check that has been transmitted over an unsecure communication link; and responsive to determining that said encrypted first copy of said electronic check matches said encrypted second copy of said electronic check and that the payment authorization has been received, processing, at said clearinghouse, a transaction transferring funds from said payor's bank to said payee's bank.

* * * * *